United States Patent [19]

Andermo

[11] Patent Number: 5,416,424
[45] Date of Patent: May 16, 1995

[54] DIELECTRIC COATING FOR CAPACITIVE POSITION TRANSDUCERS TO REDUCE SENSITIVITY TO CONTAMINANTS

[75] Inventor: Nils I. Andermo, Kirkland, Wash.

[73] Assignee: Mitutoyo Corporation, Tokyo, Japan

[21] Appl. No.: 122,909

[22] Filed: Sep. 15, 1993

[51] Int. Cl.$^6$ ............................................. G01B 7/02
[52] U.S. Cl. ................................... 324/684; 324/690; 340/870.37
[58] Field of Search ............... 324/660, 661, 662, 671, 324/672, 679, 684, 690; 340/870.37

[56] References Cited

U.S. PATENT DOCUMENTS

| | | | |
|---|---|---|---|
| 4,420,754 | 12/1983 | Andermo | 324/660 |
| 4,879,508 | 11/1989 | Andermo | 324/690 |
| 5,045,798 | 9/1991 | Hendrick | 324/690 |
| 5,049,824 | 9/1991 | Suzuki et al. | 324/660 |
| 5,172,485 | 12/1992 | Gerhard et al. | 33/706 |
| 5,304,937 | 4/1994 | Meyer | 324/690 |

Primary Examiner—Kenneth A. Wieder
Assistant Examiner—Christopher M. Tobin
Attorney, Agent, or Firm—Seed and Berry

[57] ABSTRACT

A capacitive position transducer with reduced sensitivity to particulate and fluid contaminants. The electrodes of the position transducer are provided with a relatively thick coating of dielectric material so that the series impedance of the dielectric coatings is at least equal to the maximum capacitive impedance between the coatings whether or not there are any contaminants positioned therebetween. In one embodiment, the coatings are spaced-apart from each other to create an air gap while in another embodiment the coatings are resiliently biased toward each other so that the coatings slide along each other.

14 Claims, 3 Drawing Sheets $Z_{TOTAL} = Z_1 + Z_G + Z_2$

DIELECTRIC COATING FOR CAPACITIVE POSITION TRANSDUCERS TO REDUCE SENSITIVITY TO CONTAMINANTS

TECHNICAL FIELD

This invention relates to capacitive transducers, and more particularly, to a method and apparatus for making such transducers less sensitive to liquid and particulate contaminants located between the capacitive electrodes of such transducers.

BACKGROUND OF THE INVENTION

Capacitive position transducers are becoming increasingly common in manufacturing industries. These capacitive transducers include a pair of substrates that move relative to each other along a measurement axis. A set of electrodes is carried by each of the substrates, with the electrodes of one substrate being positioned close to the electrodes on the other substrate to form a capacitor therebetween. The electrodes on each of the substrates are connected to conventional circuitry for providing an indication of the relative position between the two substrates as a function of the capacitance between various electrodes in each set. The capacitive position transducer may be of the incremental type, in which the circuitry provides only an indication of incremental movement from a known point, or an absolute position type, in which the circuitry provides an indication of the relative position between the two substrates regardless of whether their initial relative position is known. Capacitive position transducers of these types are disclosed in U.S. Pat. Nos. 4,420,754 and 4,879,508.

.Capacitive position transducers are often used as the principle component of electronic calipers for measuring thickness and other physical parameters. Although these calipers are sometimes used in dry, relatively, clean environments, such as inspection rooms or engineering offices, such calipers are often used to measure dimensions of work pieces in machine shops and other relatively dirty environments. When used in these environments, such calipers can become contaminated by particulate matter and fluids, such as cooling or cutting fluids. The liquid or particulate contaminants may find their way between each set of electrodes and affect the capacitance between the electrodes in a manner that is not related to the relative position between the substrates along the measurement axis. Contaminants between the electrodes of a capacitive position transducer degrade performance because the particulate or fluid may be a dielectric having a dielectric constant that is different from the dielectric constant of air that is in an air gap between the sets of electrodes. The capacitance between electrodes on opposite sides of the contaminate will thus be greater than the capacitance between other electrodes having the same relative geometry which do not have contaminants therebetween. Under these circumstances, the capacitance between the electrodes will not provide an accurate indication of the relative position between the substrates.

One approach to minimizing the adverse effects of contaminants in capacitive position transducers is described in U.S. Pat. No. 5,172,485 to Gerhard et al. Gerhard et al. teach coating the electrodes of each substrate with a thin layer of dielectric material and then mounting the substrate so that the dielectric material coating the electrodes of one substrate slides along the dielectric material coating the electrodes of the other substrate. In theory, the sliding contact between the dielectric layers eliminates any air gap for contaminants to fill. However, as a practical matter, the sliding contact approach described in the Gerhard et al patent cannot entirely eliminate an air gap. In fact, if there was no air gap at any area between the electrodes, very high frictional loads and wear would result. The absence of an air gap in any area between the electrodes also implies a perfect level of surface finish and flatness which is never achieved in practice. A practical best case design would still result in an air gap of 0.002–0.004 mm in some areas. For these reasons, the sliding contact approach described in the Gerhard et al. patent normally requires that the substrates be resiliently biased toward each other so that deviations from exact surface flatness and alignment can be accommodated by allowing the substrates to move apart. However, the compliant nature of the suspension for the substrates allows the substrates to be forced apart from each other by particulate contaminants which inevitably collect between the electrodes when the capacitive position transducer is used in a dirty environment. If the fluid contaminants were collected in the gap with a uniform thickness, the contaminants probably would not have an adverse affect on accuracy. However, the fluid contaminants are in fact collected between the electrodes in a highly non-uniform manner so that the thickness of the contaminant layer varies between zero and a substantial value. However, the particulate contaminants space the electrodes apart from each other by the maximum thickness of the contaminant layer. At areas between the electrodes where the fluid contaminant layer is thinner or not present, gaps are created which are filled with air. Thus, the sliding contact approach used to eliminate the air gap altogether has not proven to be adequate under most circumstances when used in contaminated environments.

SUMMARY OF THE INVENTION

It is an object of the invention to provide a capacitive transducer that is relatively insensitive to particulate and fluid contaminants between the electrodes.

It is another object of the invention to provide a technique for making capacitive transducers relatively insensitive to contaminants that can be used with a wide variety of capacitive transducer types.

These and other objects of the invention are provided by a capacitive transducer having first and second substrates that are moveable with respect to each other along a measurement axis. The substrates contain respective sets of electrodes arranged in a row extending along the measurement axis. One or both sets of electrodes is coated with a layer of dielectric material having a thickness and dielectric constant selected so that the impedance of the dielectric layers is at least as great as the maximum impedance of any air gap and contaminants positioned between the electrodes. As a result, the capacitive coupling between the first and second sets of electrodes is relatively insensitive to changes in the capacitance between the electrodes resulting from contaminants positioned between the electrodes. The substrates may be mounted so that an air gap is created between the electrodes. Alternatively, both sets of electrodes may be coated with a dielectric layer and the dielectric layers may slide along each other.

DETAILED DESCRIPTION OF THE INVENTION

Figure 1:
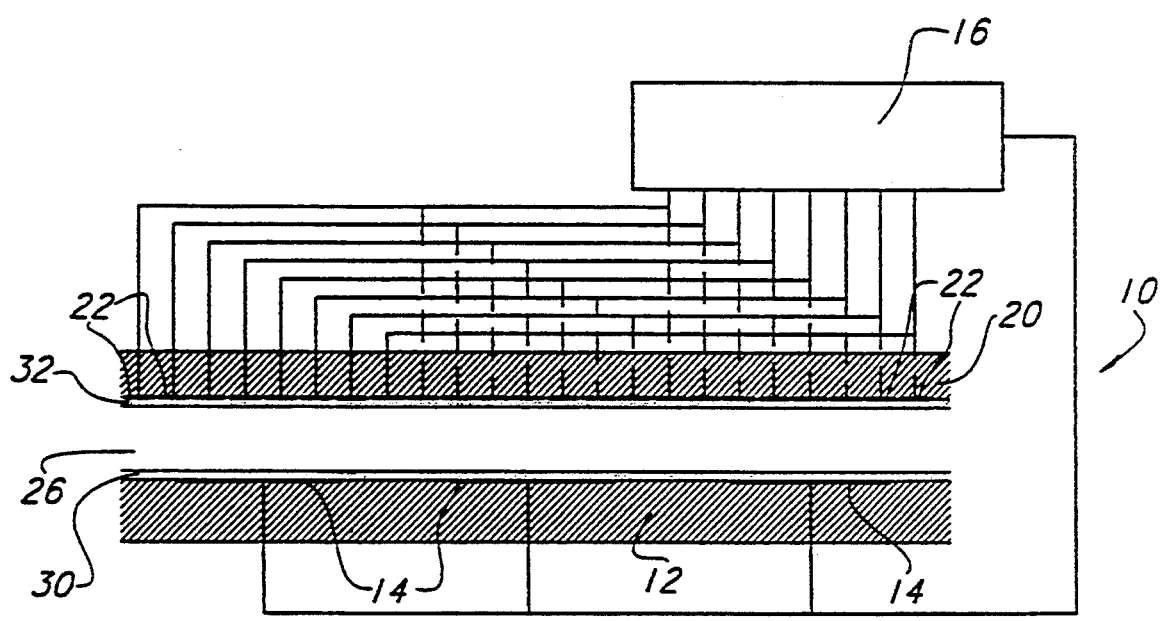
FIG. 1 is a cross sectional schematic view of a conventional, prior art capacitive position transducer having a substantial air gap.

A conventional capacitive position transducer 10 is illustrated in FIG. 1. As is well known in the art, the transducer 10 includes an insulating substrate 12 that can be mounted on a structural member forming part of a caliper or machine tool, for example. A set of electrodes 14 are mounted on the substrate 12 in a predetermined pattern of conventional design. The substrate 12 may be a printed circuit board on which the electrodes 14 are formed by conventional means. The electrodes 14 are connected to a conventional electronics unit 16.

An upper, insulating substrate 20 is mounted above the lower substrate 12 so that it can move relative to the substrate 12 along a measurement axis which extends from left to right as illustrated in FIG. 1. A set of electrodes 22 of conventional design are mounted on the surface of the upper substrate 20 facing the electrodes 14 on the lower substrate 12. The upper substrate 20 may also be a printed circuit board on which the electrodes 22 are formed by conventional means. The electrodes 22, like the electrodes 14 on the bottom substrate 12, are connected to the electronics unit 16. The electrodes 14, 22 are separated from each other by an air gap 26 and thus form capacitors in which the electrodes 14, 22 are capacitively coupled to each other through the air dielectric in the gap 26. The electronics unit 16 supplies appropriate signals to some of the electrodes 14, 22 on one of the sets, and receives signals from electrodes 14 or 22 on either set. As is well-known to one skilled in the art, the manner in which the phase or amplitude of the signals is coupled across the air gap 26 provides an indication of the relative position of the substrates 12, 20 along the measurement axis.

Although the outer surfaces of the electrodes 14, 22 may be exposed without any protective coating, in the past the electrodes 14, 22 of capacitive position transducers have been provided with a thin coating or covering of a dielectric material 30, 32. However, the purpose of the dielectric coating 30, 32 has been to protect the electrodes 14, 22 while continuing to allow the electrodes 14, 22 to be capacitively coupled to each other.

It will be apparent from FIG. 1 that there is substantial volume in the air gap 26 for both liquid and particulate contaminants to collect. Such contaminants have a dielectric constant that is significantly greater than the dielectric constant of air (i.e., 1). Since the contaminants normally fill the gap 26 in an uneven or non-symmetrical manner, the coupling between the electrodes 14, 22 is primarily a function of the distribution pattern of the contaminants in the gap 26 rather than the longitudinal position of the substrates 12, 20 relative to each other along the measurement axis. Under these circumstances, the position transducer 10 cannot provide accurate position measurements.

The problem of contaminants in the air gap 26 between the electrodes 14, 22 has been recognized. However, attempts have been made to solve this problem by reducing the size of the gap 26, thereby theoretically reducing the amount of contaminants that can be contained in the gap 26. In one conventional capacitive position transducer the air gap has been reduced to approximately 90 microns, the electrodes 22 were covered with a dielectric coating 32 having a thickness of between 30 and 70 microns and a dielectric constant of 3.8, and the electrodes 14 were covered with a dielectric coating 32 having thicknesses of between 150 and 200 microns and a dielectric constant of approximately 4. The relative impedance of the dielectric coatings 30, 32 and the air gap can be compared by comparing their ratios of thickness to dielectric constant since impedance is proportional to that ratio. The sum of the ratios of thickness of the dielectric coatings 30, 32 to their respective dielectric constants for the most favorable of this configuration is about 68 (i.e., [70/3.8]+[200/4]). The ratio of thickness to dielectric constant for the air gap is 90 (i.e., 90/1). The maximum impedance in the air gap (i.e., when air rather than contaminants are in the gap) is thus about 1.3 times the combined impedance of the dielectric coatings 30, 32 (i.e. 90/68.). The ratio of the maximum gap impedance to dielectric coating impedance is even greater (i.e., about 2) when the thickness of the dielectric coatings 30, 32 are at the thinner ends of the ranges described above. Since the problems caused by contamination are the result of a variation in capacitive coupling that is unrelated to position, a higher percentage of variable impedance (i.e., gap impedance) to fixed impedance (i.e. dielectric coating impedance) causes a greater degradation in performance for the same gap width and contaminant content. Thus, the capacitive impedance of prior art dielectric layers, being at best less than about three quarters (i.e., [1]/[1.30]) of the maximum capacitive impedance in the gap has not been sufficiently high to materially reduce the problems of contamination.

Figure 2:
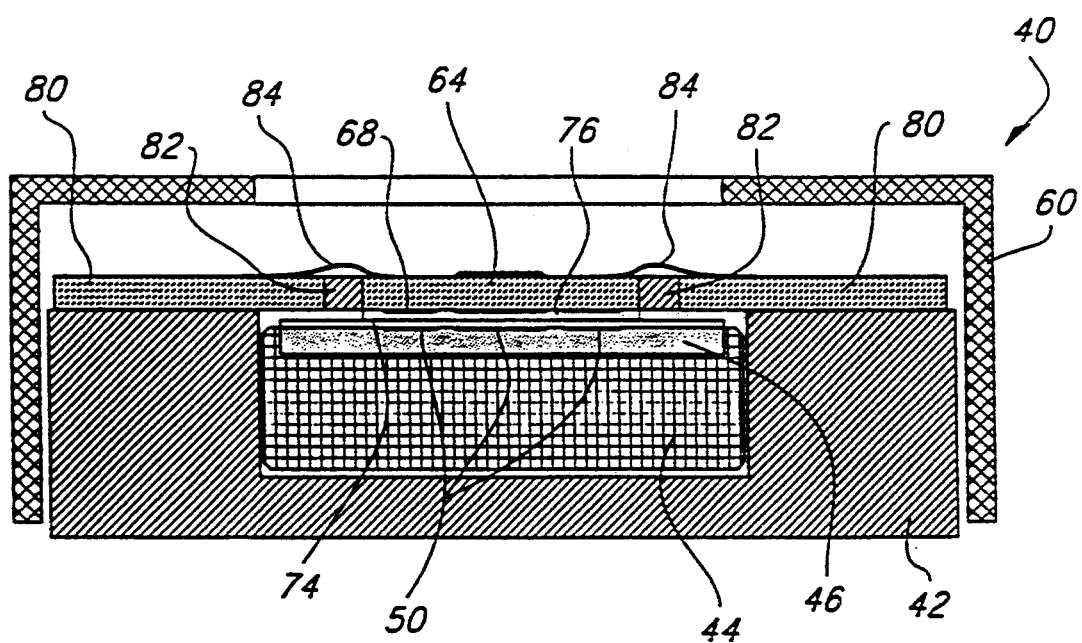
FIG. 2 is a cross sectional schematic view of a capacitive position transducer in which the electrodes on each substrate are coated with a thin layer of dielectric and placed in sliding contact with each other.

Attempts have also been made to minimize the contamination problem by eliminating the air gap altogether, as illustrated in the capacitive position transducer 40 shown in FIG. 2. As explained in detail below, the transducer 40 of FIG. 2 differs from the transducer 10 of FIG. 1 by mounting the upper substrate so that the dielectric coating for the upper electrodes is in sliding contact with the dielectric coating for the lower electrodes.

With reference to FIG. 2, the transducer 40 includes a generally rectangular base member 42 which can be part of a caliper or machine tool, for example. The base member 42 has formed therein a rectangular cut-out receiving a support block 44. The support block 44, in ram, carries an insulating substrate 46, such as a printed circuit board. A set of electrodes 50 are mounted on the substrate 46 in a predetermined pattern of conventional design.

A support frame 60 is secured to the base member 42 and encloses its upper surface along its entire length. An upper, insulating substrate 64, which may also be a printed circuit board, is mounted in the support frame 60. As will be recognized by one skilled in the art, the transducer 40 is illustrated in FIG. 2 as a transverse cross-sectional view showing the structure on a plane taken perpendicularly to a measurement axis along which the lower substrate 46 moves relative to the upper substrate 64. The structure for mounting the substrate 64 in the support frame 60 is conventional and thus has been omitted for purposes of clarity. The substrate 64, like the substrate 46, carries a set of electrodes 68.

As mentioned above, the transducer 40 of FIG. 2 differs from the transducer 10 of FIG. 1 by mounting the upper substrate 64 so that a dielectric coating 74 for the lower electrodes 50 is in sliding contact with a dielectric coating 76 for the upper electrodes 68. However, as explained above, it is necessary to mount the upper substrate 64 so that it is resiliently biased toward the lower substrate 46 but is free to move vertically. For this purpose, the substrate 64 is mounted in a substrate support 80 by flexible material 82, such as rubber, bonded between the substrate 64 and the substrate support 80. Resilient springs 84 extending between the substrate 64 and the substrate support 80 resiliently bias the substrate 64 downwardly so that the surfaces of the dielectric coatings 74, 76 are maintained in contact with each other.

By eliminating the air gap altogether, the capacitive position transducer 40 of FIG. 2 would appear to eliminate the problem of contaminants finding their way into an air gap between the upper and lower set of electrodes. However, because the substrate 64 is free to move vertically away from the lower substrate 46, fluid and particulate contaminants may eventually find their way between the dielectric coatings 74, 76 and displace the upper substrate 64 upwardly away from the lower substrate 46. When the upper substrate 64 is displaced upwardly away from the lower substrate 46, gaps are created between the substrates 46, 64 in the areas where the contaminant layer is not present or is thinner than the spacing between the upper substrate 64 and the lower substrate 46. For this reason, the sliding electrode concept illustrated in FIG. 2 has not been entirely successful in solving the contaminant problem.

Figure 3:
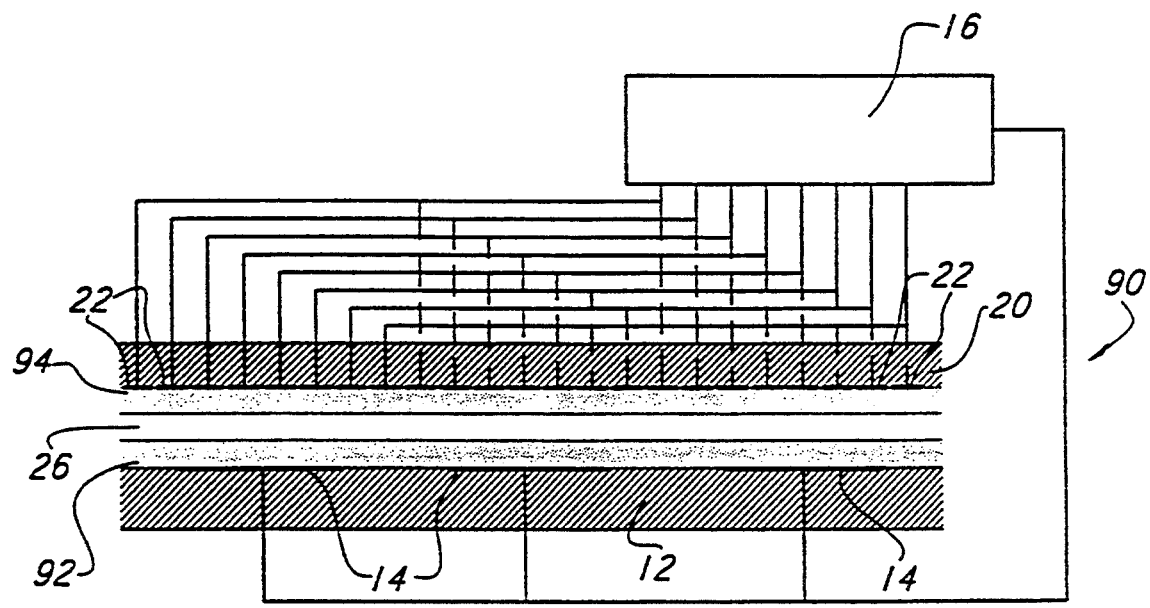
FIG. 3 is a cross sectional schematic view of one embodiment of the inventive capacitive position transducer which is relatively insensitive to environmental contaminants.

One embodiment of the inventive capacitive position transducer 90 is illustrated in FIG. 3. For the purposes of brevity, the components of the embodiment of FIG. 3 that are identical to the conventional capacitive position transducer 10 of FIG. 1 have been provided with the same reference numerals and they will not be separately explained. The inventive position transducer 90 departs from conventional wisdom by attempting to solve the contaminant problem in a manner that does not rely upon keeping the contaminants out of the air gap 26 between the electrodes 14, 22. Instead, the inventive capacitive position transducer 90 attempts to minimize the effect of the contaminants between the electrodes 14, 22. With reference to FIG. 3, the electrodes 14, 22 are covered with respective, relatively thick dielectric coatings 92, 94. Although the dielectric constant of the material used for the dielectric coatings 92,94 is greater than one (i.e., the dielectric constant of air), the coatings 92,94 are sufficiently thick that the impedance of the dielectric coating 92,94 are greater than the impedance of the air gap 26 before it has been at least partially filled with a contaminant.

Figure 4:
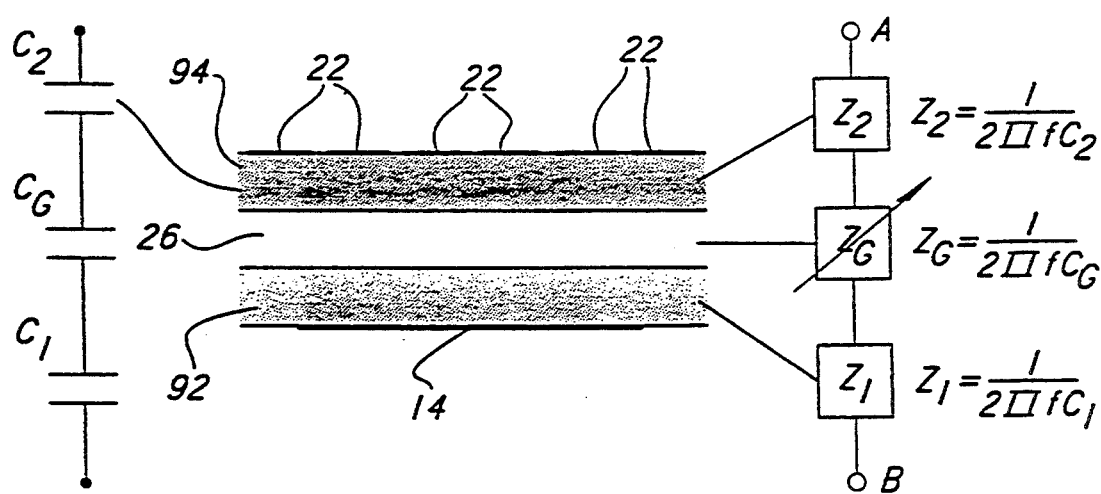
FIG. 4 is a schematic representing the capacitances and impedances between the electrodes in the capacitive position transducer of FIG. 3.

The capacitive coatings 92, 94 and air gap 26 can be represented by the schematic illustrated in FIG. 4, where $C_1$ represents the capacitance of the dielectric coating 92, $C_G$ represents the capacitance of the air gap 26, and $C_2$ represents the capacitance of the capacitive coating 94. In a similar manner, $Z_1$ represents the impedance of the dielectric coating 92, $Z_G$ represents the impedance of the air gap 26, and $Z_2$ represents the impedance of the capacitive coating 94. It will be apparent from FIG. 4 that, if the capacitances $C_1$ and $C_2$ are much smaller than the capacitance $C_G$, then the impedance of $Z_1$ and $Z_2$ will be much greater than the impedance of $Z_G$. Under these circumstances, changes in the value of the capacitance $C_G$ will have relatively little effect on the impedance from terminal A to terminal B. As a result, the use of the dielectric coatings 92,94 having a high impedance (i.e., low ratio of dielectric constant to thickness) will make the coupling between terminals A and B relatively insensitive to variations of the capacitance $C_G$. As mentioned above, the capacitive impedances of the dielectric coatings 92, 94 and the air gap 26 can be compared to each other by comparing their respective ratio of thickness to dielectric constant. Using this approach, the capacitive impedance of the air gap 26 will, of course vary, but the maximum capacitive impedance in an inter electrode region bounded by the capacitive coatings 92, 94 will be when air (dielectric constant=1) is in the gap 26. When air is in the inter electrode region, the ratio of thickness to dielectric constant will be equal to the thickness of the inter electrode region since the dielectric constant of air is 1.

The maximum impedance of the air gap 26 must be less than the impedance of the series combination of the dielectric coatings 92,94. The sum of the ratio of thickness to dielectric constant for both dielectric coatings 92, 94 must therefore be less than the thickness of the air gap. The maximum impedance of the air gap 26 should preferably be less than one-half of the series combination of the impedance of the dielectric coating 92,94. The sum of the ratio of thickness to dielectric constant for both dielectric coatings 92, 94 is, therefore, preferably more than twice the thickness of the air gap. Finally, it is desirable for the maximum impedance of the air gap 26 to be less than about one-third of the series combination of the impedance of the dielectric coating 92, 94. It is therefore desirable for the sum of the ratio of thickness to dielectric constant for both dielectric coatings 92, 94 to be more than three times the thickness of the air gap. Thus, if the dielectric constant of both dielectric coatings 92, 94 is 4, the sum of the thicknesses of the dielectric coatings 92, 94 must be at least four times the thickness of the air gap 26, preferably 8 times the thickness of the air gap 26, and most desirably 12 times the thickness of the air gap 26. In the example given, if contaminants in the gap 26 cause the impedance of the air gap to fall from 1,000 ohms to 500 ohms, the overall impedance across the gap will change from 2,000 ohms to 1,500 ohms. Thus, even if the contaminants cause the impedance across the air gap 26 to decline by 50%, the overall impedance between the electrodes 14, 22 will change by only 25%. However, in the preferred situation where the combined impedance of the capacitive coatings 92, 94 is twice the maximum impedance of the air gap, the contaminants would cause the impedance between the electrodes 14, 22 to change from 3,000 ohms to 2500 ohms. Thus, in the preferred situation, a change in gap impedance of 50% would result in a change in impedance between the electrodes 14, 22 of only 16.7%. Finally, in the most desirable configuration where the combined impedance of the capacitive coatings 92, 94 is three times the maximum impedance of the air gap, the contaminants would cause the impedance between the electrodes 14, 22 to change from 4,000 ohms to 3,500 ohms. Thus, in the most desirable situation, a change in gap impedance of 50% would result in a change in impedance between the electrodes 14, 22 of only 12.5%. While dielectric coatings for the electrodes 14, 22 of capacitive position transducers have been used, as explained above, there was no appreciation that the dielectric coatings, if made sufficiently thick, could reduce the effect of contaminants between the electrodes 14, 22. As a result, the capacitive coatings were used only to protect the electrodes, and they were thus too thin relative to the practical air gap to have any material effect on the problem of contaminants in the air gap.

Figure 5:
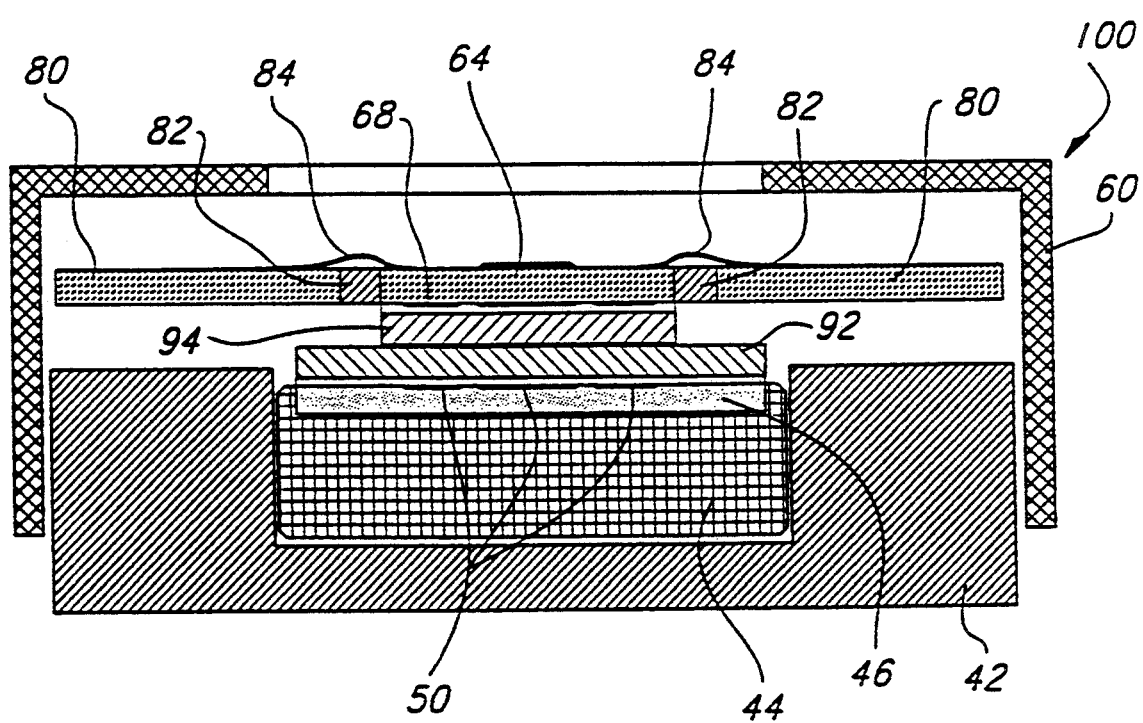
FIG. 5 is a cross sectional schematic view of another embodiment of the inventive capacitive position transducer which is relatively insensitive to environmental contaminants.

An alternative embodiment of an inventive capacitive position transducer 100 is illustrated in FIG. 5. The position transducer 100, like the position transducer 90 of FIG. 3, utilizes relatively thick dielectric coatings 92, 94. However, the capacitive position transducer 100 of FIG. 5 utilizes a sliding contact between the dielectric coatings 92, 94. For this purpose, the position transducer 100 utilizes the same substrate, electrode and suspension structure that is used in the previously described position transducer of FIG. 2. Specifically, the upper substrate 64 is mounted in a substrate support 80 by flexible material 82, and it is resiliently biased in a downward direction by springs 84.

In the embodiment 100 of FIG. 5, the series impedance of the capacitive coatings 92,94 should be at least equal to the maximum impedance between the coatings 92, 94 when the practical limits of surface roughness and flatness have forced the coatings 92, 94 apart from each other to create air gaps in the inter electrode region bounded by the capacitive coatings 92, 94. Therefore, the sum of the ratio of thickness to dielectric constant for both dielectric coatings 92, 94 must be less than the maximum ratio of thickness to dielectric constant in the inter electrode region bounded by the coatings 92, 94. As explained above, the maximum ratio of thickness to dielectric constant in the inter electrode region will occur when air is in the inter electrode region. Since the dielectric constant of air is 1, the maximum ratio of thickness to dielectric constant in the inter electrode region is simply the thickness of the inter electrode region bounded by the dielectric coatings 92, 94. The inter electrode region will always have some thickness as a result of either practical manufacturing constraints or the dielectric coatings 92, 94 being forced apart from each other by contaminants. Thus, the sum of the ratio of thickness to dielectric constant for both dielectric coatings 92, 94 must be less than the thickness of the inter electrode region bounded by the coatings 92, 94.

Although the series impedance of the dielectric coatings 92, 94 must be at least equal to the maximum impedance in the inter electrode region between the coatings 92, 94, the series impedance of the dielectric coatings is preferably at least twice the maximum impedance between in the inter electrode region between the coatings 92, 94 as manufactured and also when fluid contaminants have entered between the coatings 92, 94. Finally, the series impedance of the dielectric coatings 92, 94 is most desirably at least three times the maximum impedance between the coatings 92, 94 as manufactured and also when contaminants have entered between the coatings 92, 94. As mentioned above, practical capacitive transducers using the "sliding contact" approach still create air gaps in the range of 0.002–0.004 mm. The thinnest dielectric coating 92, 94 could be used when an air gap of 0.002 mm was achieved. Larger air gaps would require thicker dielectric coatings 92, 94. Of course, larger air gaps caused by contaminants increasing the spacing between the dielectric coatings 92, 94 would require significantly thicker dielectric coatings 92, 94. Using an example of dielectric coatings 92, 94 having a dielectric constant of 4, the sum of the thickness of the dielectric coatings 92, 94 must be at least 0.008 mm, is preferably at least 0.016 mm, and is most desirably at least 0.024 mm.

It is thus seen that the inventive capacitive position transducer seeks to eliminate the effects of contaminants rather than the contaminants themselves. The inventive transducer is able to accomplish this function for a wide variety of contaminant conditions merely by adjusting the thickness or dielectric constant of the coating. Moreover, the technique of using a thick dielectric coating for the electrodes of capacitive position transducers can be used to solve this type of contamination problem for virtually any type of capacitive position transducer. It will therefore be understood that the capacitive position transducers and Specific coating thicknesses described herein are for illustration only and should not be used to limit the scope of the claims.

I claim:

1. In a capacitive transducer of the type having a first substrate containing a first set of electrodes arranged along a measurement axis, and a second substrate containing a second set of electrodes arranged along said measurement axis, said first and second substrates being positioned with said first and second sets of electrodes opposite each other so that the capacitive coupling between said first and second set of electrodes provides an indication of the relative position of said first and second substrates along said measurement axis, an improved structure for making said transducer relatively insensitive to contaminants positioned between said first and second sets of electrodes, said structure comprising a layer of dielectric material coating at least one set of said first and second sets of electrodes, the sum of the ratios of thickness to dielectric constant for each layer of dielectric material coating said electrodes being greater than twice the ratio of the thickness of any gap between any portion of said electrodes to the dielectric constant of air so that the maximum capacitive impedance in any gap between any portion of said first and second sets of electrodes is less than one-half the capacitive impedance between said first and second sets of electrodes in said dielectric material coextensive with said portion.

2. The transducer of claim 1 wherein an air gap of less than 0.004 mm exists between at least a portion of said first and second electrodes, and wherein the sum of said ratios of thickness in mm to dielectric constant for each dielectric material between said first and second set of electrodes is greater than the ratio of 0.008 mm to the dielectric constant of air.

3. The transducer of claim 2 wherein the sum of said ratios of thickness to dielectric constant for each dielectric material between said first and second set of electrodes is greater than the ratio of 0.0 12 mm to the dielectric constant of air.

4. The transducer of claim 1 wherein the sum of said ratios of thickness to dielectric constant for each dielectric material between said first and second set of electrodes is at least three times the ratio of the thickness of any gap between any portion of said electrodes to the dielectric constant of air so that the maximum capacitive impedance in any portion of any gap between said first and second sets of electrodes is less than one-third the impedance between said first and second sets of electrodes in said dielectric material coextensive with said portion.

5. The transducer of claim 1 wherein both said first and second sets of electrodes are coated with said dielectric material.

6. The transducer of claim 1 wherein an air gap of at least 0.002 mm exists between at least a portion of said first and second electrodes, and wherein the sum of said ratios of thickness to dielectric constant for each dielectric material between said first and second set of electrodes is greater than the ratio of 0.004 mm to the dielectric constant of air.

7. A capacitive transducer, comprising:
   a first substrate;
   a first set of electrodes mounted on said first substrate, said first set of electrodes being generally arranged in a row extending along a measurement axis;
   a second substrate;
   a second set of electrodes mounted on said second substrate, said second set of electrodes being generally arranged in a row extending along said measurement axis;
   mounting means for positioning said first and second substrates so that said first and second substrates are moveable with respect to each other along said measurement axis, and so that said first and second sets of electrodes face each other whereby the capacitive coupling between said first and second set of electrodes is indicative the relative position between said first and second substrates along said measurement axis;
   a first layer of dielectric material coating said first set of electrodes;
   a second layer of dielectric material coating said second set of electrodes, at least a portion of said first and second layers of dielectric material having an air gap of up to 0.01 mm therebetween, said first and second layers of dielectric material having a dielectric constant and a thickness selected so that the combined capacitive impedance over any portion of said first and second layers of dielectric material is greater than twice the capacitive impedance in any air gap coextensive with said portion and between said first and second layers of dielectric material so that said capacitive transducer is relatively insensitive to contaminants.

8. The transducer of claim 7 wherein said combined capacitive impedance for any portion of said first and second layers of dielectric material is greater than 3 times said capacitive impedance in any such coextensive air gaps.

9. The transducer of claim 7 wherein the sum of said ratios of thickness to dielectric constant for each dielectric material between said first and second set of electrodes is greater than the ratio of 0.02 mm to the dielectric constant of air.

10. The transducer of claim 7 wherein the sum of said ratios of thickness to dielectric constant for each dielectric material between said first and second set of electrodes is greater than the ratio of 0.03 mm to the dielectric constant of air.

11. The transducer of claim 7 wherein an air gap of at least 0.002 mm exists between at least a portion of said first and second electrodes.

12. A capacitive transducer, comprising:
   a first substrate;
   a first set of electrodes mounted on said first substrate, said first set of electrodes being generally arranged in a row extending along a measurement axis;
   a second substrate;
   a second set of electrodes mounted on said second substrate, said second set of electrodes being generally arranged in a row extending along said measurement axis;
   mounting means for positioning said first and second substrates so that said first and second substrates are moveable with respect to each other along said measurement axis, and so that said first and second sets of electrodes face each other whereby the capacitive coupling between said first and second set of electrodes is indicative the relative position between said first and second substrates along said measurement axis;
   a first layer of dielectric material coating said first set of electrodes; and
   a second layer of dielectric material coating said second set of electrodes, said first and second layers of dielectric material having a dielectric constant and a thickness selected so that the combined capacitive impedance over any portion of said first and second layers of dielectric material is at least twice the capacitive impedance in any air gap coextensive with said portion and between said first and second layers of dielectric material so that said capacitive transducer is relatively insensitive to contaminants.

13. The transducer of claim 12 wherein said first and second layers of dielectric material have a dielectric constant and a thickness selected so that the combined capacitive impedance over any portion of said first and second layers of dielectric material is at least three times the capacitive impedance in any air gap coextensive with said portion and between said first and second layers of dielectric material.

14. The transducer of claim 12 wherein an air gap of at least 0.002 mm exists between at least a portion of said first and second electrodes.

* * * * *